United States Patent
Osborne

(10) Patent No.: US 7,293,397 B2
(45) Date of Patent: Nov. 13, 2007

(54) APPARATUSES AND METHODS FOR CONTROLLING SELF-PROPELLED MACHINES

(75) Inventor: Christopher M. Osborne, Hillsborough, NC (US)

(73) Assignee: Honda Motor Co., Ltd., Minato-ku, Tokyo (JP)

(*) Notice: Subject to any disclaimer, the term of this patent is extended or adjusted under 35 U.S.C. 154(b) by 0 days.

(21) Appl. No.: 11/440,257

(22) Filed: May 24, 2006

(65) Prior Publication Data
US 2006/0218887 A1    Oct. 5, 2006

Related U.S. Application Data

(62) Division of application No. 10/870,744, filed on Jun. 17, 2004.

(51) Int. Cl.
*A01D 69/00* (2006.01)
(52) U.S. Cl. .................................................... 56/10.8
(58) Field of Classification Search ................ 56/10.8, 56/16.7, 14.7; 172/17, 42; 180/19.3, 65.6
See application file for complete search history.

(56) References Cited

U.S. PATENT DOCUMENTS

| | | | |
|---|---|---|---|
| 2,706,008 A | * | 4/1955 | Voigt .................. 180/19.2 |
| 2,764,268 A | | 9/1956 | Summerour |
| 2,791,079 A | | 5/1957 | Funk |
| 2,813,433 A | | 11/1957 | Adams |
| 3,678,770 A | | 7/1972 | Enters et al. |
| 4,063,612 A | * | 12/1977 | Weiss .................. 180/19.2 |
| 4,281,732 A | | 8/1981 | Hoch |
| 4,309,862 A | | 1/1982 | Carlson |
| 4,327,539 A | | 5/1982 | Bricko et al. |
| 4,335,566 A | | 6/1982 | Hurd |
| 4,430,848 A | | 2/1984 | Wistrom |
| 4,466,232 A | | 8/1984 | Beugelsdyk et al. |
| 4,476,643 A | | 10/1984 | Hilchey et al. |
| 4,531,347 A | | 7/1985 | Schütz |
| 4,573,307 A | | 3/1986 | Wick |
| 4,667,459 A | | 5/1987 | Scanland et al. |
| 4,704,847 A | | 11/1987 | Greider et al. |
| 4,835,949 A | | 6/1989 | Seyerle |
| 4,841,794 A | | 6/1989 | Hikishima |
| 4,882,897 A | | 11/1989 | Oshima et al. |
| 4,924,988 A | | 5/1990 | Page |
| 4,932,192 A | | 6/1990 | Ishimaru |

(Continued)

*Primary Examiner*—Arpad F Kovacs
(74) *Attorney, Agent, or Firm*—Jenkins, Wilson, Taylor & Hunt, P.A.

(57) ABSTRACT

Apparatuses and methods are provided for controlling a self-propelled machine wherein the apparatuses and methods include a handle and a control device and can utilize first and second linking members. The control device is pivotably coupled to the handle, and includes a slidable control portion that is linearly translatable relative to the handle. The first linking member includes a first proximal section that is coupled to the control device, and a first distal section that is engagable with the machine. The first linking member is actuatable in response to pivoting of the control device. The second linking member includes a second proximal section coupled to the control device and a first distal section engagable with a transmission. The second linking member is actuatable in response to sliding of the slidable control portion. The control device can be pivoted between an ON state and an OFF state to implement operator presence control. The slidable control portion can be linearly translated to implement variable speed control.

16 Claims, 10 Drawing Sheets

U.S. PATENT DOCUMENTS

| | | | |
|---|---|---|---|
| 4,967,543 A * | 11/1990 | Scag et al. ..................... 56/10.8 |
| 5,251,711 A | 10/1993 | Meyer et al. |
| 5,316,097 A | 5/1994 | Meyer et al. |
| 5,375,674 A | 12/1994 | Peter |
| 5,377,774 A | 1/1995 | Lohr |
| 5,467,583 A | 11/1995 | Beugelsdyk et al. |
| 5,542,241 A | 8/1996 | Lydy et al. |
| 5,601,512 A * | 2/1997 | Scag .......................... 477/111 |
| 5,657,828 A * | 8/1997 | Nagamachi ................ 180/19.3 |
| 5,701,967 A | 12/1997 | Barnard |
| 5,718,105 A | 2/1998 | Irikura et al. |
| 5,735,064 A | 4/1998 | Holl |
| 6,047,614 A | 4/2000 | Beugelsdyk et al. |
| 6,082,083 A | 7/2000 | Stalpes et al. |
| 6,089,005 A * | 7/2000 | Kallevig ...................... 56/10.9 |
| 6,475,109 B2 | 11/2002 | Blanchard |
| 7,040,448 B2 * | 5/2006 | Good ......................... 180/334 |
| 2002/0178708 A1 | 12/2002 | Williams et al. |
| 2002/0183145 A1 | 12/2002 | Blanchard |
| 2003/0056481 A1 | 3/2003 | Trefz |
| 2006/0053763 A1 * | 3/2006 | Stover et al. ................ 56/16.7 |

* cited by examiner

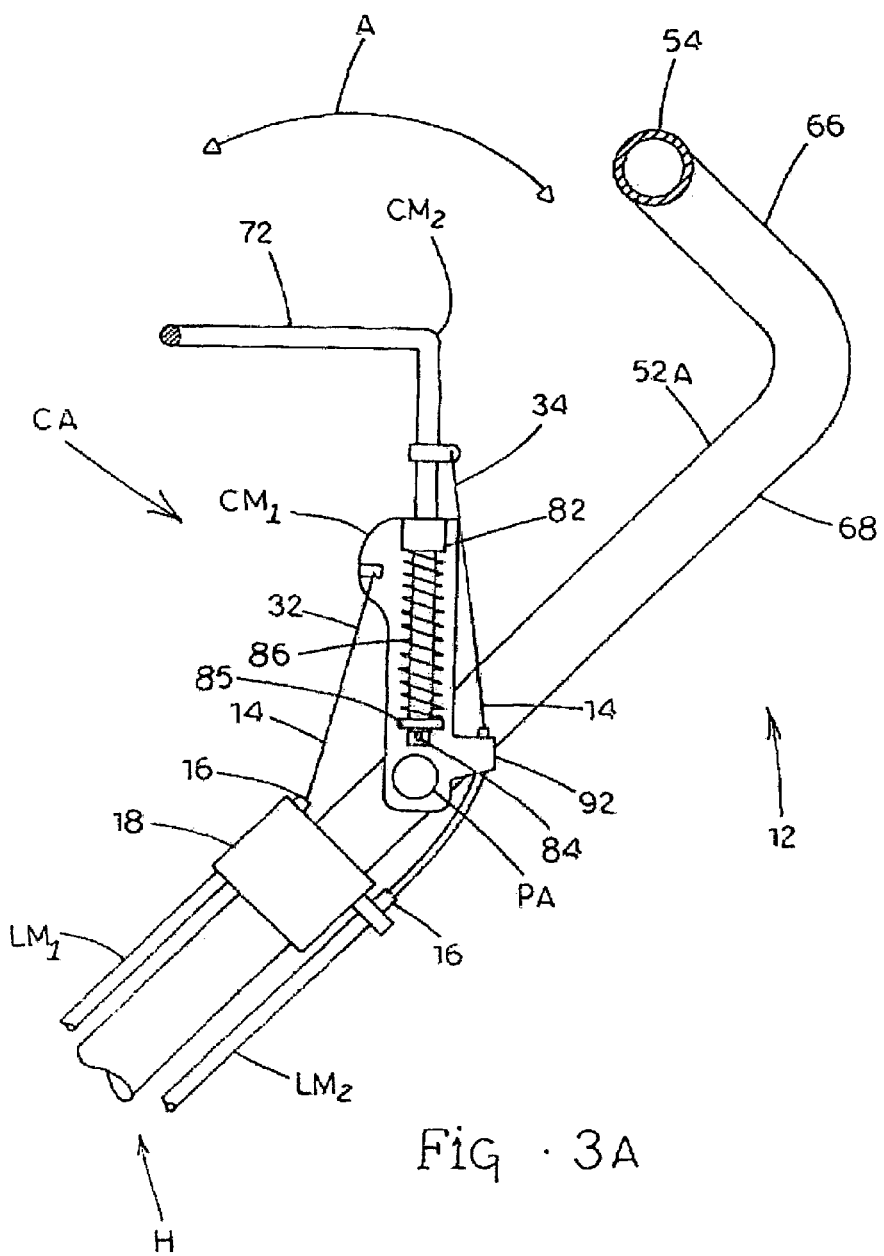
FIG · 3A

APPARATUSES AND METHODS FOR CONTROLLING SELF-PROPELLED MACHINES

RELATED APPLICATION

This application is a divisional patent application which claims the benefit of and priority to U.S. Utility patent application Ser. No. 10/870,744 filed Jun. 17, 2004, the disclosure of which is incorporated herein by reference in its entirety.

TECHNICAL FIELD

The present subject matter generally relates to controlling operations of a self-propelled machine such as a lawn mowing machine and, more particularly, to providing integrated operator presence control and speed control apparatuses and methods.

BACKGROUND ART

Self-propelled machines, such as lawn mowing machines and the like, often provide handles on which controls are mounted for manipulation by operators or users of such machines. In particular, a "walk behind" type, self-propelled mowing machine typically has a handle extending behind a power plant or other main operative assembly of the machine for gripping by the operator as the operator walks behind the machine during movement thereof in a forward direction. Typically, one or more controls are mounted towards the end of the handle in a convenient location for the user to manipulate while gripping the handle and operating the machine. Typically, each control device mounted to the handle is only capable of implementing a single function. Accordingly, the ability of an operator to control multiple types of functions has conventionally required the mounting of multiple types of control mechanisms or other devices on the handle of the machine. Unfortunately, recent marketing research indicates that many consumers of self-propelled machines would prefer a minimum number of control mechanisms requiring manipulation during operation of such machines in order to simplify use of the machines.

Many examples exist of conventional self-propelled machines that require the use of multiple, separate controls to implement different functions. U.S. Pat. No. 4,835,949 to Seyerle discloses a self-propelled lawnmower in which a handle can be pivoted toward a mower deck of the lawnmower in order to increase the speed of the lawnmower. The lawnmower also includes an operator presence control feature, embodied in a separate lever attached to the handle. To enable the lawnmower to be operated, the operator must manipulate the lever. This lever, however, cannot be used to adjust the speed of the lawnmower, as that function is implemented by the handle separately from and independently of the operator presence lever. U.S. Patent Application Publication No. US 2003/0056481 to Trefz discloses a self-propelled lawnmower in which a speed control lever is coupled to a handle of the lawnmower, and a separate operator presence control lever is coupled to the speed control lever. Manipulation of the speed control lever cannot be used to effect operator presence control and, likewise, manipulation of the operator presence control lever cannot be used to adjust speed. Similarly, U.S. Pat. No. 6,082,083 to Stalpes et al. discloses a self-propelled lawnmower in which operator presence control and speed control are implemented by means of separate levers or handles.

Therefore, it would be advantageous to minimize the number of separate user-operated control mechanisms provided in self-propelled machines such as lawn mowing machines in order to simplify or make easier the use of control features in such machines.

SUMMARY

According to one embodiment, an apparatus for controlling a self-propelled machine comprises a handle, a control device, and first and second linking members. The control device is pivotably coupled to the handle, and comprises a slidable control portion that is linearly translatable relative to the handle. The first linking member comprises a first proximal section that is coupled to the control device, and a first distal section that is engagable with the machine. The first linking member is actuatable in response to pivoting movement of the control device. The second linking member comprises a second proximal section coupled to the control device and a first distal section engagable with a transmission. The second linking member is actuatable in response to sliding of the slidable control portion.

According to another embodiment, an apparatus for controlling a self-propelled machine comprises a handle, first and second control members, and first and second linking members. The first control member is coupled to the handle and is pivotable relative thereto between an OFF position and an ON position. The second control member is pivotable with the first control member, and is slidably coupled thereto between a LOW position and a HIGH position. The first linking member comprises a first proximal section coupled to the first control member and a first distal section engagable with a machine control component. Through action of the first linking member, pivoting movement of the first control member to the OFF position causes the machine control component to disable an operation of a machine communicating with the machine control component. Pivoting movement of the first control member to the ON position causes the machine control component to disable the operation. The second linking member comprises a second proximal section coupled to the second control member and a second distal section engagable with a transmission. Through action of the second linking member, sliding of the second control member to the LOW position decreases a speed of the transmission, and sliding of the second control member to the HIGH position increases the speed.

According to yet another embodiment, a self-propelled machine comprises a powered drive system, a handle, a control device, and first and second linking members. The powered drive system comprises a motor, a transmission engagable with the motor for receiving power from the motor, and a machine control component for alternately enabling and disabling an operation of the machine. The transmission comprises a speed control component for controlling a speed of the transmission. The control device is pivotably coupled to the handle and comprises a slidable control portion that is linearly translatable relative to the handle. The first linking member comprises a first proximal section coupled to the control device and a first distal section coupled to the machine control component. The first linking member is actuatable in response to pivoting movement of the control device. The second linking member comprises a second proximal section coupled to the control device and a first distal section coupled to the speed control component. The second linking member is actuatable in response to sliding of the second control member.

A method is also provided for controlling a self-propelled machine. A control apparatus is pivotally moved relative to a handle to which the control apparatus is coupled, from an OFF position at which a machine communicating with the control apparatus is disabled to an ON position at which the machine is enabled. The pivoting movement actuates a first linking member that intercouples the control apparatus and a machine control component of the machine. While the control apparatus is in the ON position, the control apparatus is linearly translated relative to the handle to adjust a speed at which the machine is propelled. The translation actuates a second linking member that intercouples the control apparatus and a transmission of the machine.

It is therefore an object to provide apparatuses and methods for a single lever control for a self-propelled machine.

An object of the present subject matter having been stated hereinabove, and which is addressed in whole or in part by the present subject matter, other objects will become evident as the description proceeds when taken in connection with the accompanying drawings as best described herein below.

BRIEF DESCRIPTION OF THE DRAWINGS

FIG. 3A is a side elevation view of the upper section of the handle, illustrating the control apparatus in an OFF position;

DETAILED DESCRIPTION OF THE INVENTION

Figure 1A:
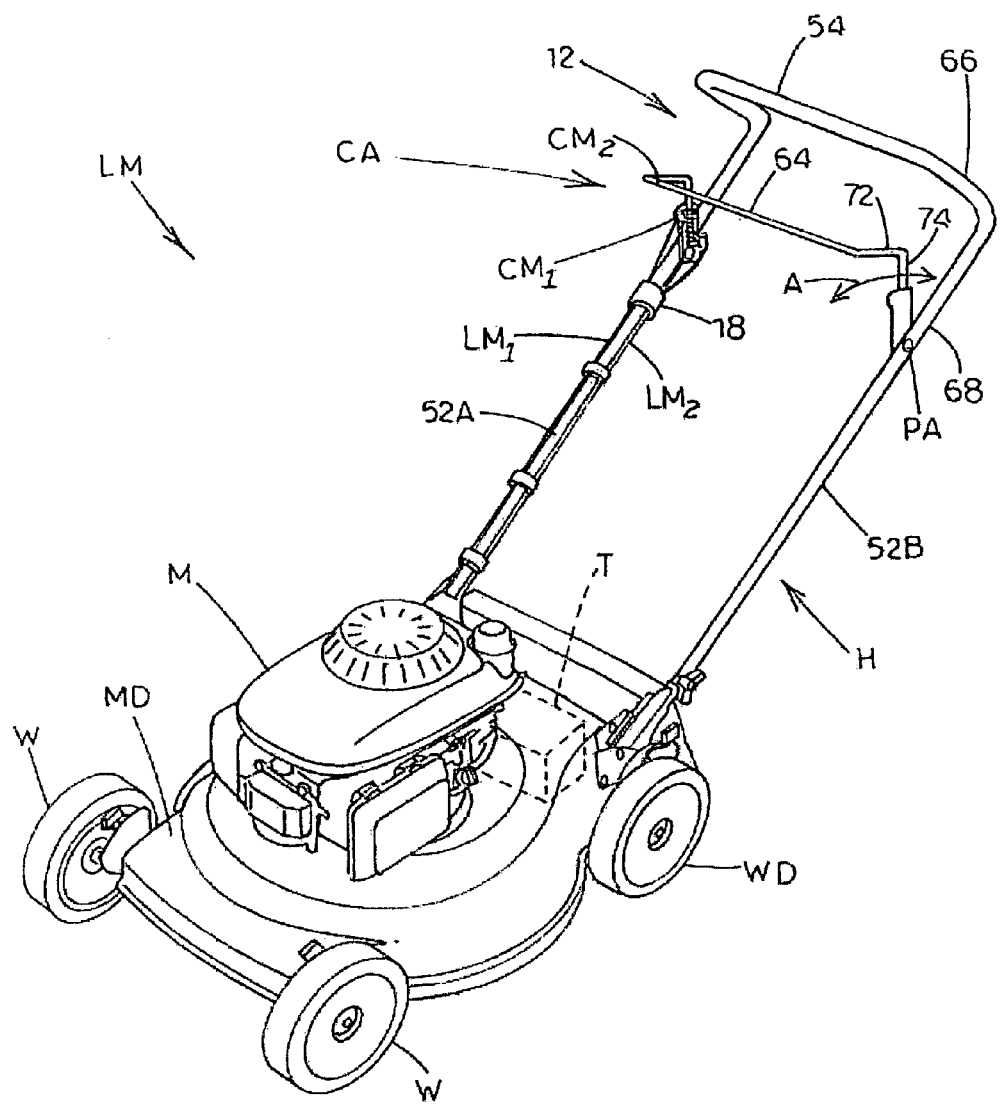
FIG. 1A is a perspective view of a self-propelled machine including a control apparatus provided in accordance with an embodiment disclosed herein.
Figure 1B:
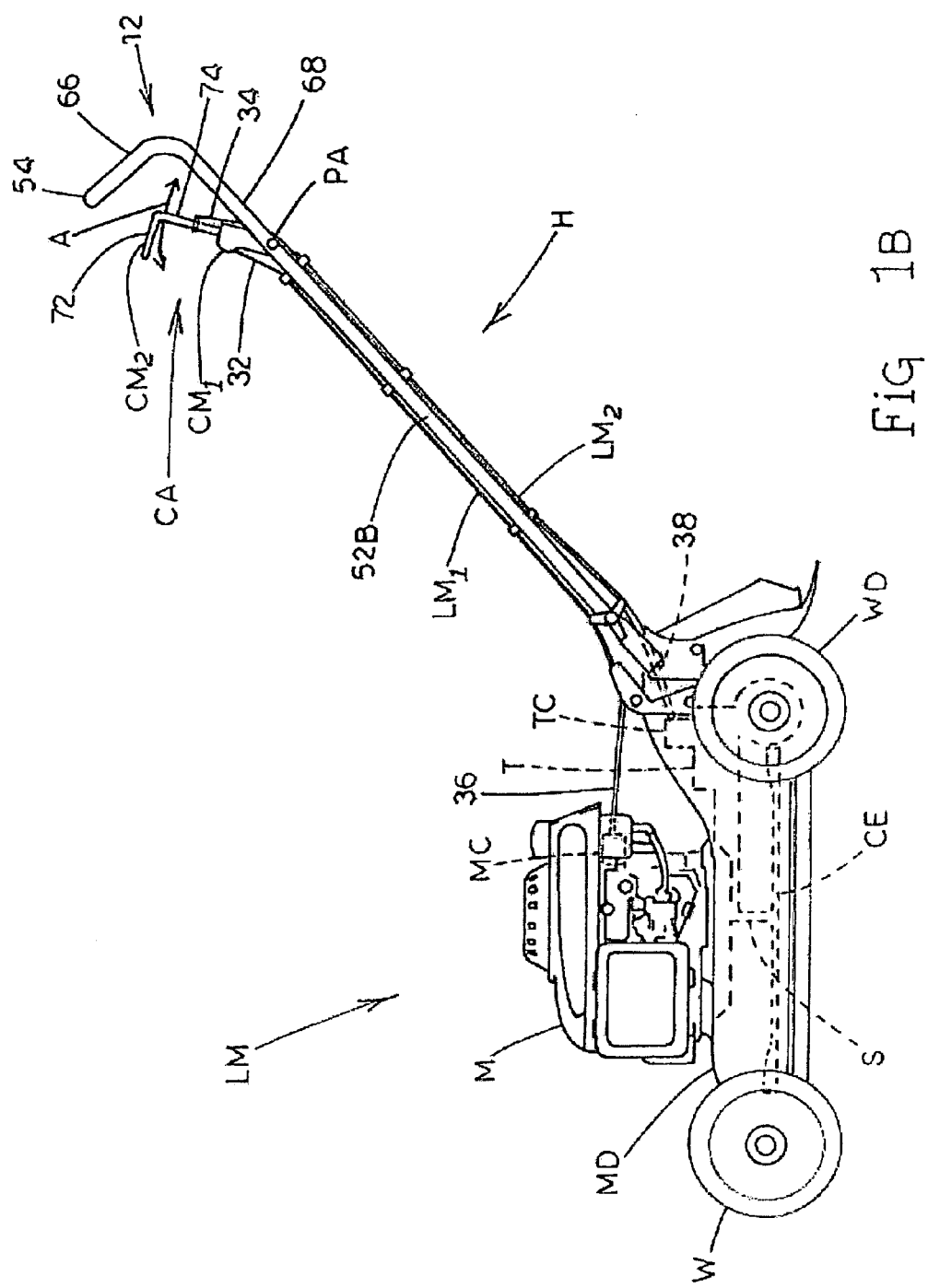
FIG. 1B is a side elevation view of the machine illustrated in FIG. 1B.

Referring now to FIGS. 1A and 1B, a self-propelled machine is generally illustrated by way of example. As one non-limiting example of an implementation of the principles disclosed herein, the machine is illustrated as a self-propelled lawnmower, generally designated LM. It can be appreciated, however, that the embodiments disclosed herein are not limited to lawnmowers or to any particular type of lawnmower such as a riding mower or a walk-behind mower. The embodiments can apply to any suitable self-propelled machines, whether the riding or walk-behind type, such as snow blowers, leaf blowers, yard vacuums, tillers, edgers, seeders, trimmers, aerators, fertilizers, palette trucks, graders, vehicles for transportation, pavement and construction machines, and the like.

Continuing with the example provided in FIGS. 1A and 1B, lawnmower LM can comprise any suitable configuration generally known to persons skilled in the art or later developed. In the exemplary embodiment, lawnmower LM includes a frame such as a mower deck MD. A handle, generally designated H, is coupled to mower deck MD by any suitable means, and extends upwardly therefrom at an angle appropriate for comfortable grasping and manipulation by an operator. Mower deck MD is supported for rolling movement over a surface by a set of wheels and can include one or more idle (non-driving) wheels W and one or more driving wheels WD. The embodiment is not limited to which one or more of wheels W functions as driving wheel or wheels WD, although typically the rearmost wheel or wheels serve this function.

Lawnmower LM also includes a powered drive system or assembly. The powered drive system includes a suitable motor M, such as an electric motor or an internal combustion engine, and a transmission T, both of which are mounted to mower deck MD in a suitable manner. As shown in FIG. 1B, an output shaft S of motor M rotates a suitable cutting element CE such as a blade or blades disposed within an interior of mower deck MD. Motor M also can transfer power to driving wheel WD through transmission T, thereby rendering lawnmower LM self-propelled in response to control by the operator. Torque from output shaft S can, for example, be transferred to an input shaft (not shown) of transmission T via an endless belt (not shown). Torque from the input shaft can be transferred to an output shaft (e.g., an axle or half-shaft coupled to respective driving wheels WD) through an appropriate reducing or transfer means such as a gear set (not shown). The embodiments disclosed herein, however, are not limited to any particular configuration of transmission T. In advantageous embodiments, transmission T can be a variable-speed transmission, and particularly a continuously variable-speed transmission. As appreciated by persons skilled in the art, by providing an appropriate control mechanism, an operator can control the output speed of a continuously variable-speed transmission, and thus the speed of driving wheel WD, over a continuous or substantially continuous range between a zero or low speed and a maximum high speed.

The different types, structures, and functions of the components of lawnmower LM just described are generally known to persons skilled in the art, and therefore will not be further described.

As illustrated in FIGS. 1A and 1B, lawnmower LM includes a control apparatus, generally designated CA. Control apparatus CA is pivotably coupled to handle H at a suitable pivot axis PA (e.g., an axle, pin, bolt, dowel, or the like). Preferably, control apparatus CA is disposed at or near a proximal end section, generally designated 12, of handle H (i.e., the portion of handle H proximate to the operator in the course of typical use of lawnmower LM) to facilitate manipulation by an operator. Control apparatus CA communicates with motor M and/or transmission T through a first linking member LM1, and communicates with transmission T through a second linking member LM2. As appreciated by persons skilled in the art, first and second linking members LM1 and LM2 can be any suitable elongate components that are either flexible or rigid, and capable of transferring a force or actuation by translation and/or a change in tension.

Referring to FIG. 3A, a non-limiting example of first linking member LM1 and/or second linking member LM2 is a cable 14, such as a Bowden wire, at least a portion of which is typically encased and extended through a coaxial sheath 16. To maintain a general position of first linking member LM1 and/or second linking member LM2 relative to lawnmower LM, first linking member LM1 and/or second linking member LM2 can be retained at one or more locations on lawnmower LM by one or more retaining members such as a retaining member 18 shown in FIG. 3A. In alternative embodiments, first linking member LM1 and/or second linking member LM2, or portions thereof, can be routed through interior portions of handle H.

Control apparatus CA serves two primary functions: (1) an operator presence or deadman control, and (2) a speed control. These functions are respectively implemented through the interaction of control apparatus CA and motor M and/or transmission T via the respective intercouplings provided by first and second linking members LM1 and LM2. As shown in FIG. 1B, a proximal end or end section 32 of first linking member LM1 is coupled to control apparatus CA by any suitable means. As described in more detail below, pivoting or rotation of control apparatus CA relative to handle H actuates first linking member LM1 to implement the operator presence control. A proximal end or end section 34 of second linking member LM2 is also coupled to control apparatus CA by any suitable means. As also described in more detail below, linear translation of control apparatus CA relative to handle H actuates second linking member LM2 to implement the speed control.

As appreciated by persons skilled in the art, the operator presence control in general is a safety feature that is typically movable between two states, ON and OFF, and typically is biased toward its OFF state. When the operator is operating or manipulating lawnmower LM in an intended manner, such as by properly gripping both handle H and control apparatus CA, the operator presence control is in the ON position. The ON position permits the motor M to be activated and cutting element CE to be driven, and permits lawnmower LM to be propelled using the power generated by motor M as transferred by transmission T. When, on the other hand, the operator is not operating or manipulating lawnmower LM in an intended manner, such as by releasing or failing to properly grip control apparatus CA, the operator presence control is in the OFF position. The OFF position disables motor M, cutting element CE, and/or transmission T. Accordingly, referring to FIG. 1B, a distal end or end section 36 of first linking member LM1 can be characterized generally as being coupled to the drive system of lawnmower LM, i.e., to its motor M and/or transmission T. Thus, first linking member LM1 can be coupled to a kill switch of motor M that disconnects motor M from an ignition component (in the case of an internal combustion engine) or a battery or source of line voltage (in the case of an electric motor), a throttle of motor M, and/or a clutch, flywheel brake or similar device that controls the transfer of power from motor M to cutting element CE, transmission T and/or driving wheel WD. In FIG. 1B, the connection between first linking member LM1 and the drive system is generally represented in a non-limiting manner by an operating or machine control component MC.

As also appreciated by persons skilled in the art, the speed control determines the speed at which lawnmower LM is self-propelled, and thus is movable between a LOW state at which the speed of lawnmower LM is either zero or a low speed, and a HIGH state at which the speed of lawnmower LM is at a maximum operating speed, and often is movable to intermediate states between the LOW and HIGH states. In lawnmowers equipped with continuously variable-speed transmissions, the throttle of motor M (when provided as an internal combustion engine) is typically fixed at a constant or substantially constant setting (i.e., the speed of the motor is constant, such as 3100 rpm) during normal cutting operations. Often, this throttle setting corresponds to an optimized motor speed at which components of motor M can rotate in a balanced manner with minimal vibration, while maintaining the effectiveness of cutting element CE. Nonetheless, as appreciated by persons skilled in the art, provision can be made for adjusting the throttle in special circumstances, such as to a choke setting for improved start-up conditions. Due to the normally constant throttle setting, the speed control typically interfaces with the transmission T to adjust one or more components thereof. Accordingly, a distal end or end section 38 of second linking member LM2 is illustrated in FIG. 1B as being connected to a transmission control component TC. Depending on the particular design of transmission T, transmission control component TC can be mechanically associated with a cam, variable-pitch pulley, dog clutch, cone clutch, friction or pressure plate, gear, fluid control circuit, brake and/or other suitable device as appreciated by persons skilled in the art. The LOW state can correspond to a condition in which such a device decouples power transfer between motor M and transmission T.

Referring to FIGS. 1A and 1B, control apparatus CA in advantageous embodiments includes first and second control members CM1 and CM2. By way of example, first control member CM1 is illustrated generally in the form of a mounting member, plate, bracket or the like, and second control member CM2 is illustrated generally in the form of a bail, lever, arm or the like. First control member CM1 is directly coupled to handle H by any suitable means that allows first control member CM1 to rotate or pivot about pivot axis PA in a generally arcuate direction relative to handle H, as depicted generally by arrow A in FIGS. 1A, 1B and 3A. Second control member CM2 is coupled to first control member CM1 by any suitable means that allows second control member CM2 to pivot with first control member CM1 as a unitary component relative to handle H, but also allows second control member CM2 to slide or linearly translate relative to first control member CM1 and handle H, as depicted generally by arrow B in FIGS. 3B and 3C. First control member CM1 can be rotated by rotating second control member CM2. Thus, the operation of control apparatus CA to carry out either operator presence control (rotation or pivoting) or speed control (sliding or linear translation) requires the manipulation by an operator of only second control member CM2. As a result, control apparatus CA combines the functions of both operator presence control and speed control in a single lever manipulated by the operator, i.e., second control member CM2.

Figure 2:
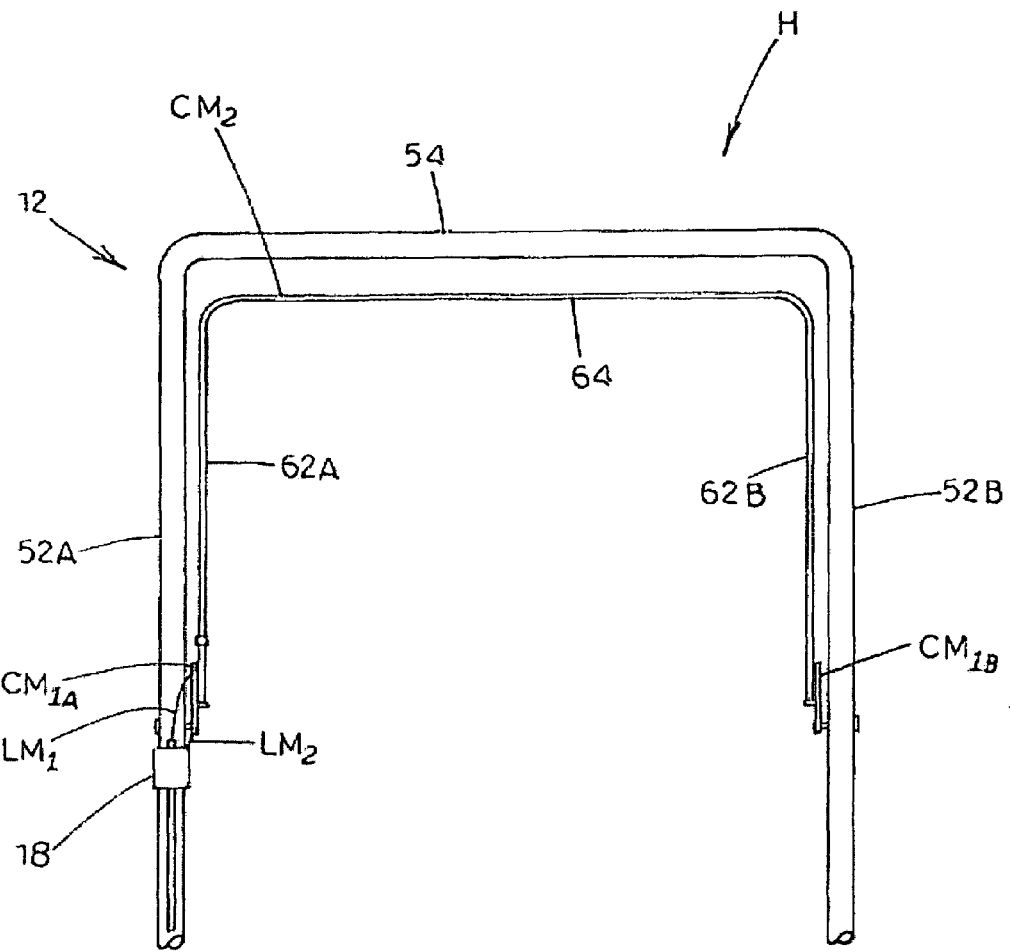
FIG. 2 is a top plan view of an upper section of a handle of the self-propelled machine with the control apparatus mounted thereto and in the OFF position.

Referring to the top plan view of FIG. 2, proximal end section 12 of handle H, i.e., the section farthest from the main operational components of lawn mower LM such as motor M and transmission T, is intended to be gripped by the operator. In one embodiment, proximal end section 12 of handle H is generally U-shaped, and thus includes first and second spaced-apart legs 52A and 52B, respectively, joined by a central portion 54. In the illustrated embodiment, central portion 54 generally corresponds to a proximal-most section 66 of handle H (see FIGS. 1A and 1B), although the scope of the embodiment is not so limited. In advantageous embodiments, to facilitate the manipulation by the operator of second control member QM2 of control apparatus CA while gripping handle H, second control member CM2 can be shaped to at least generally conform to the shape of proximal end section 12 of handle H as shown in FIG. 2. Thus, second control member CM2 likewise includes first and second spaced-apart legs 62A and 62B, respectively, joined by a central portion 64. Alternative embodiments can exclude central portions 54 and 64, in which case legs 52A, 52B and 62A, 62B, respectively, can remain separated. As also shown in FIG. 2, in one embodiment, first control member CM1 can include two separate portions CM1A and CM1B. One portion CM1A is pivotably coupled to first leg 52A of handle H, and the other portion CM1B is pivotably coupled to second leg 52B of handle H, with first and second linking members LM1 and LM2 shown in FIG. 1 being coupled to one portion CM1A. It will be understood that first and second control members CM1 and CM2 can be disposed on either the insides of legs 52A and 52B of handle H as illustrated, or on the outsides of legs 52A and 52B.

FIGS. 1A and 1B also show the conformity of second control member CM2 and proximal end section 12 of handle H from a side perspective. As further shown in FIGS. 1A and 1B, in one embodiment, handle H can include a proximal-most end section 66 (i.e., the section that is typically disposed closest to an operator during normal operation) that is angled upwards relative to a main section 68 of handle H, and second control member CM2 likewise can include a proximal-most end section 72 that is angled upwards relative to a main section 74 of second control member CM2. The angled configuration affords flexibility in that the operator can choose from a variety of locations at which handle H and second control member CM2 can be comfortably manipulated.

Referring now to FIG. 3A, additional features of control apparatus CA are illustrated. Second control member CM2 is slidably coupled to first control member CM1 by any means suitable for enabling linear translation of second control member CM2 and, as a result, actuation of second linking member LM2. In FIG. 3A, as one example, first control member CM1 includes one or more collars 82 or other type of retaining members through which a portion of second control member CM2 extends. If one collar 82 is employed as illustrated in FIG. 3A, it should be axially long enough to prevent excessive pivoting play in second control member CM2 relative to first control member CM1, because first control member CM1 should pivot about pivot axis PA in direct response to operator-actuated pivoting of second control member CM2. Second control member CM2 can be secured to first control member CM1 by any means suitable for preventing second control member CM2 from becoming separated from collar 82. As one example, second control member CM2 can include one or more bosses or pins 84 extending radially outwardly from its main outer surface. Contact between collar 82 and pin 84, or between collar 82 and a washer 85 disposed around second control member CM2, can prevent second control member CM2 from being pulled out from collar 82 and separated from first control member CM1. The annular tolerance between second control member CM2 and the opening of collar 82 through which second control member CM2 extends is large enough to enable sliding motion, yet small enough to prevent unnecessary play and to enable first control member CM1 to be pivoted in direct response to second control member CM2 being pivoted through manipulation by the operator.

In advantageous embodiments, a spring 86 or other biasing means can be interfaced between first control member CM1 and second control member CM2 for biasing second control member CM2 either toward or away from first control member CM1. As illustrated, for instance, spring 86 is coaxially disposed about an end portion of second control member CM2, is attached to collar 82, and is attached to or in forcible contact with washer 85. Washer 85 is maintained in abutment with pin 84 due to the force of spring 86, and can assist in evenly distributing this force. Alternatively, washer 85 and pin 84 can constitute a unitary structure.

Typically, the direction in which second control member CM2 is biased by spring 86 is the one that causes the speed of lawnmower LM to decrease. In one embodiment, speed can increase as second control member CM2 is pulled back toward proximal-most end section 66 of handle H (see FIG. 3C) and thus toward the operator. In this embodiment, the position of spring 86 can be fixed relative to first control member CM1 and second control member CM2 such that spring 86 tends to pull second control member CM2 away from the proximal-most end section 66 of handle H and the operator, and thus toward the LOW speed position shown in FIG. 3B. In this configuration, the operator must use one or both hands and/or fingers to pull or squeeze second control member CM2 toward the proximal-most end section 66 of handle H in order to increase speed.

FIG. 3A illustrates second control member CM2 in a raised or angled position relative to handle H or at least main section 68 thereof, which can correspond to an OFF position of lawnmower LM. Because first control member CM1 and second control member CM2 pivot or rotate together relative to handle H, first linking member LM1 can be attached either to first control member CM1 (as shown) or to second control member CM2. In either case, rotation of first control member CM1 and second control member CM2 relative to handle H actuates first linking member LM1. The action (e.g., pushing or pulling, tightening or slackening, etc.) of first linking member LM1 is transferred through its length to actuate machine control component MC (e.g., a throttle, clutch, switch, brake, or the like) schematically illustrated in FIG. 1B.

In the OFF position, as described previously, operation control element prevents a critical operation of lawnmower LM to prevent injury to the operator. In some embodiments, a biasing mechanism (not shown) can be employed to bias second control member CM2 to the OFF position. For instance, first linking member LM1 could be biased at some point along its length to maintain a force that tends to pull second control member CM2 away from handle H to the angled OFF position. As another example, a biasing force could be applied to machine control component MC (FIG. 1B) and transferred through first linking member LM1 to yield the same result. It will be noted that in the OFF position, linear translation of second control member CM2 relative to first control member CM1 has no effect, as lawnmower LM is inoperative at the OFF position.

Figure 3B:
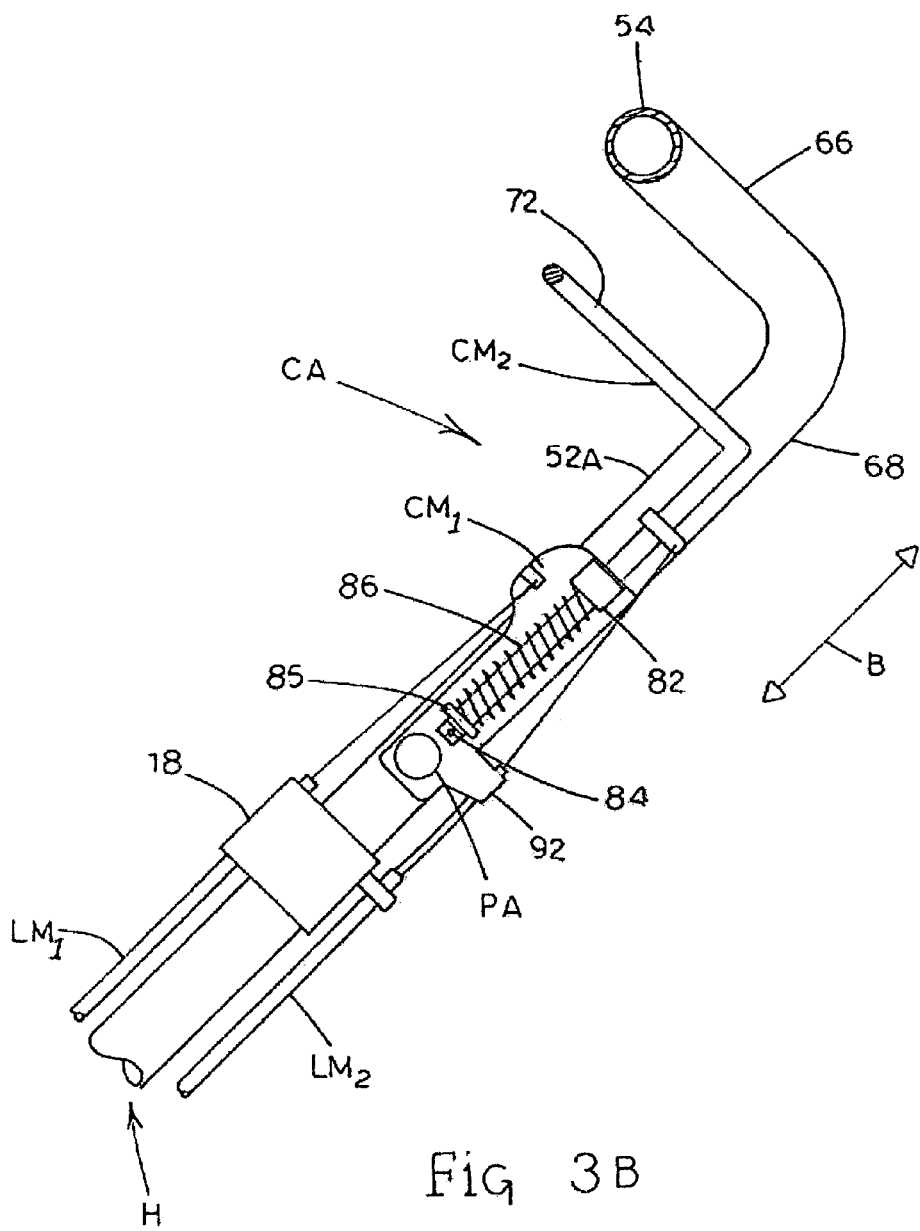
FIG. 3B is a side elevation view of the upper section of the handle, illustrating the control apparatus of FIG. 3A in an ON position.
Figure 3C:
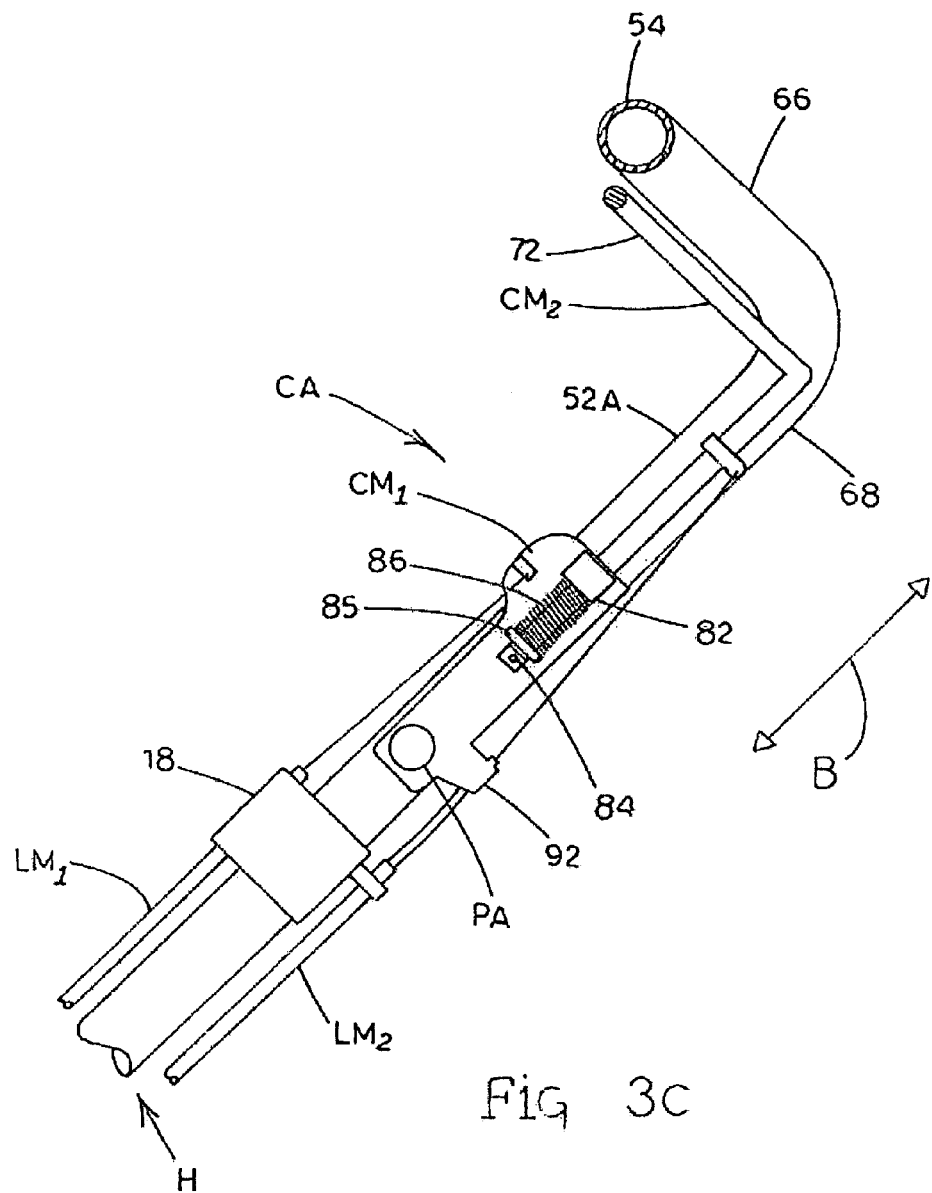
FIG. 3C is a side elevation view of the upper section of the handle, illustrating the control apparatus of FIGS. 3A and 3B in the ON position but linearly translated to a different speed position as compared to FIG. 3B.

FIGS. 3B and 3C illustrate second control member CM2 in a position in which it can be linearly translated relative to handle H between a HIGH speed position and a LOW speed position, in a direction generally parallel to handle H or at least a main section 68 thereof. In one embodiment, FIG. 3B illustrates the LOW speed position and FIG. 3C illustrates the HIGH speed position. Thus, the operator can slow down lawnmower LM by simply relaxing the grip on second control member CM2 and handle H, and can speed up lawnmower LM by tightening the grip. In this embodiment, proximal-most end section 72 of second control member CM2 is farthest from proximal-most end section 66 of handle H at the LOW speed position, and closest at the HIGH speed position. In an alternative embodiment, the result of sliding second control member CM2 is reversed such that FIG. 3B corresponds to the HIGH speed position and FIG. 3C corresponds to the LOW speed position. In, either case, the sliding actuation of second control member CM2 causes an actuation in second linking member LM2 that is transferred through its length to transmission control component TC (e.g., a clutch, pressure plate, belt tensioner, or the like) schematically shown in FIG. 1B. As appreciated by persons skilled in the art, the specifics of the interaction between transmission control component TC and transmission T as a result of sliding second control member CM2 will depend on the type or configuration of transmission T.

Because second control member CM2 is manipulated by the operator to slide relative to first control member CM1, it is preferable that second linking member LM2 be directly coupled to second control member CM2. In the exemplary arrangement shown in FIGS. 3A-3B, a portion of second linking member LM2 is mounted or retained generally at the underside of handle H, or at least some distance from first linking member LM2. For this configuration, first control member CM1 can include a mounting or guiding member 92 that contacts second linking member LM2 to maintain a spaced relation between second linking member LM2 and first linking member LM1, and/or to ensure that second linking member LM2 does not interfere with the sliding movement of second control member CM2.

The operation of control apparatus CA will now be briefly described, using an example in which pulling second control member CM2 toward proximal-most end section 66 of handle H increases the speed of lawnmower LM. FIG. 3A shows the OFF position of lawnmower LM, as described above. The OFF position is the normal position during non-use of lawnmower LM. In addition, during use of the lawnmower LM and at any speed thereof, if the operator releases second control member CM2, second control member CM2 returns to the OFF position, typically under the influence of a suitable biasing force. To activate motor M, such as by cranking an internal combustion engine, the operator rotates second control member CM2 (and thus first control member CM1) from the OFF position shown in FIG. 3A to the ON position shown in FIG. 3B. The ON position in FIG. 3B also corresponds to the LOW speed position of lawnmower LM. In advantageous embodiments, the LOW speed position corresponds to a zero speed position at which no (or negligible) power is transferred by transmission T from motor M to driving wheel WD. Such an embodiment is useful for preventing lawnmower LM from jerking forward immediately upon start up. Depending on the type of transmission T with which control apparatus CA is interfaced, the LOW speed position can, if desired, involve a physical detachment in the power transmission path between motor M and driving wheel WD such as the disengagement of a clutch, or a stoppage in rotation of some critical component such as through application of a braking or friction device.

After motor M has been activated, and while continuing to hold down second control member CM2 in the ON position to maintain powered operation of lawnmower LM, the operator can adjust the speed of lawnmower LM by linearly sliding second control member CM2 relative to first control member CM1 between the extreme LOW speed position shown in FIG. 3B and the extreme HIGH speed position shown in FIG. 3C. The operator can adjust the speed by using the operator's hand to pull in or let out second control member CM2 over its linear range of travel. In embodiments where transmission T is continuously variable, a substantially infinite number of speed settings are attainable between the lowest and highest speeds by sliding second control member CM2. In advantageous embodiments, at the low position, the distance between proximal-most end section 72 of second control member CM2 and proximal-most end section 66 of handle H is small enough to enable a single hand of the operator to grip both second control member CM2 and handle H at the same time.

Figure 4:
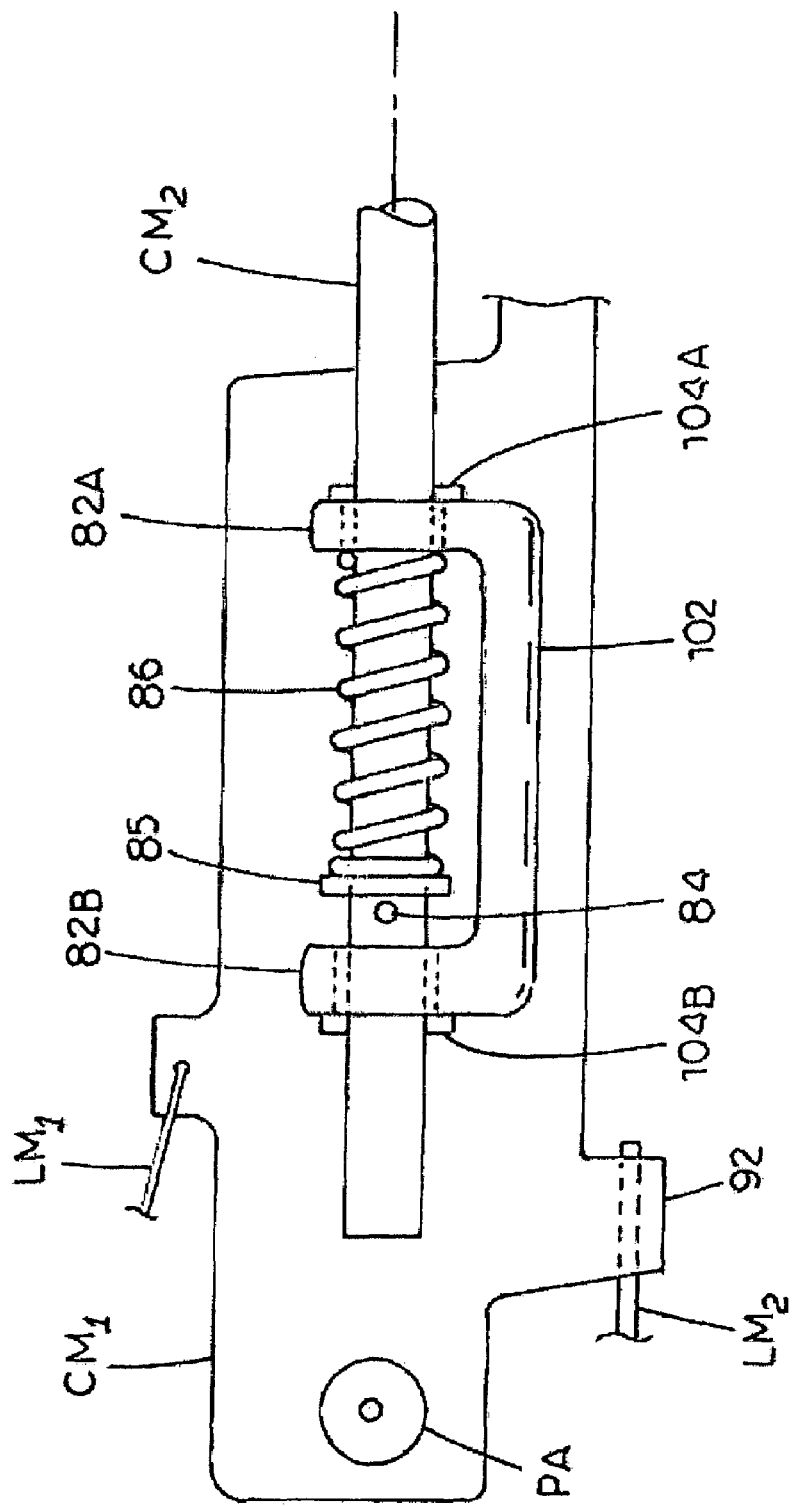
FIG. 4 is a side elevation view of features of a control apparatus according to another embodiment.

Referring now to FIG. 4, an alternative interface between first control member CM1 and second control member CM2 is illustrated, and is applicable to any embodiments disclosed herein. A bracket 102 is formed from or secured to first control member CM1 by any suitable means. Bracket 102 includes two or more axially aligned collar portions 82A and 82B through which second control member CM2 extends in adjacency to the main portion of first control member CM1. If desired or necessary, bushings 104A and 104B can be disposed within each collar portion 82A and 82B, respectively, to facilitate the sliding motion of second control member CM2 and/or to reduce wear resulting from such sliding motion.

Figure 5A:
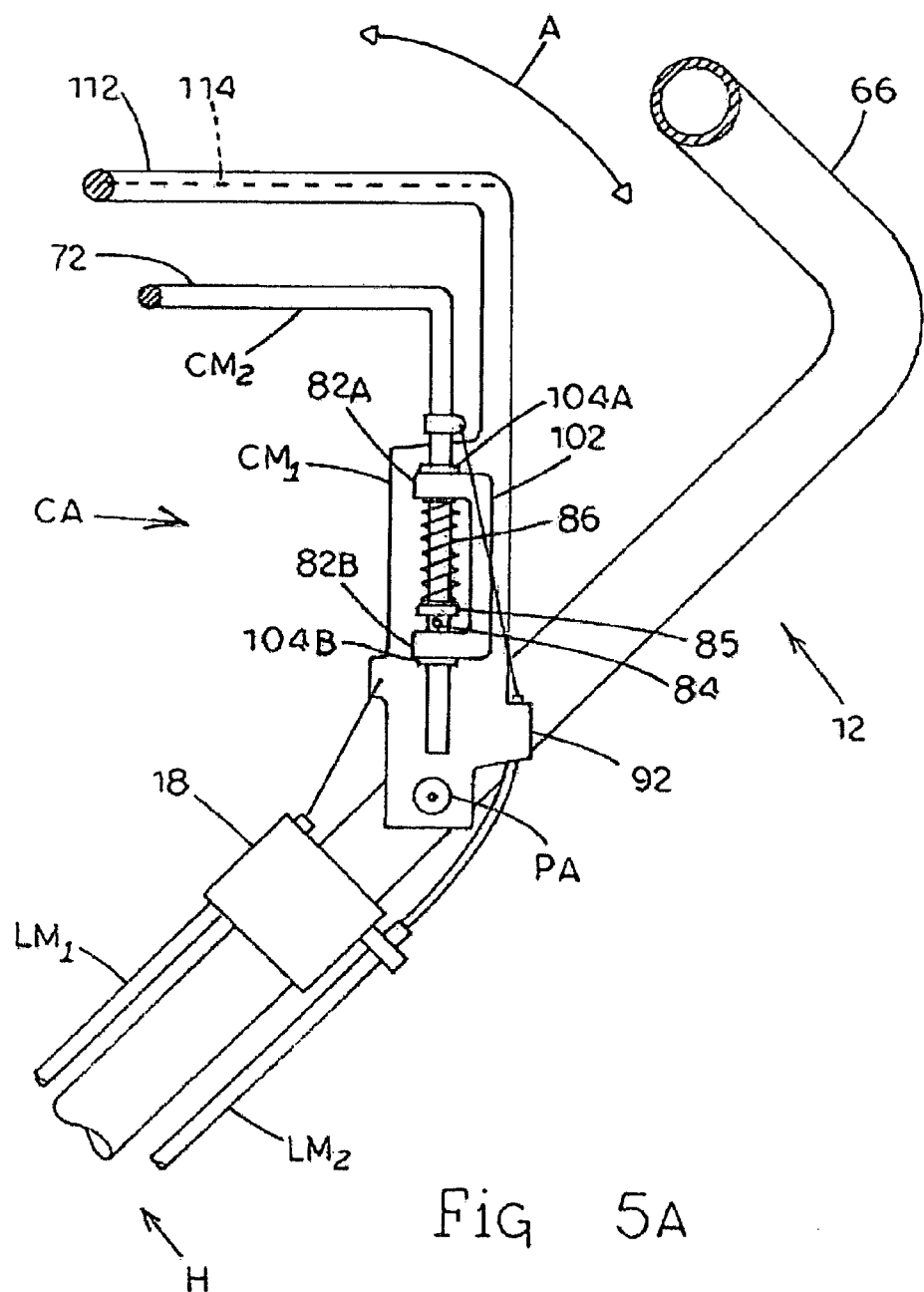
FIG. 5A is a side elevation view of the upper section of the handle, illustrating a control apparatus according to yet another embodiment in an OFF position.
Figure 5B:
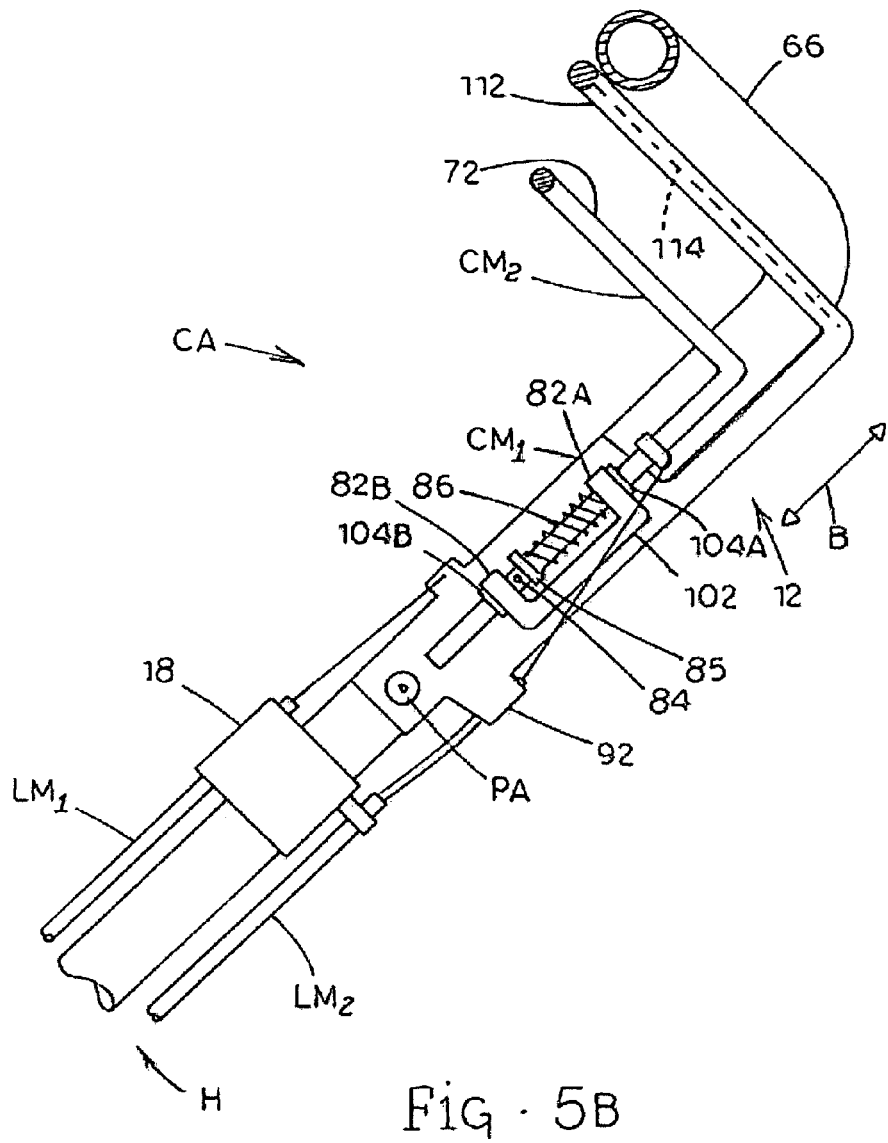
FIG. 5B is a side elevation view of the upper section of the handle, illustrating the control apparatus of FIG. 5A in an ON position.
Figure 5C:
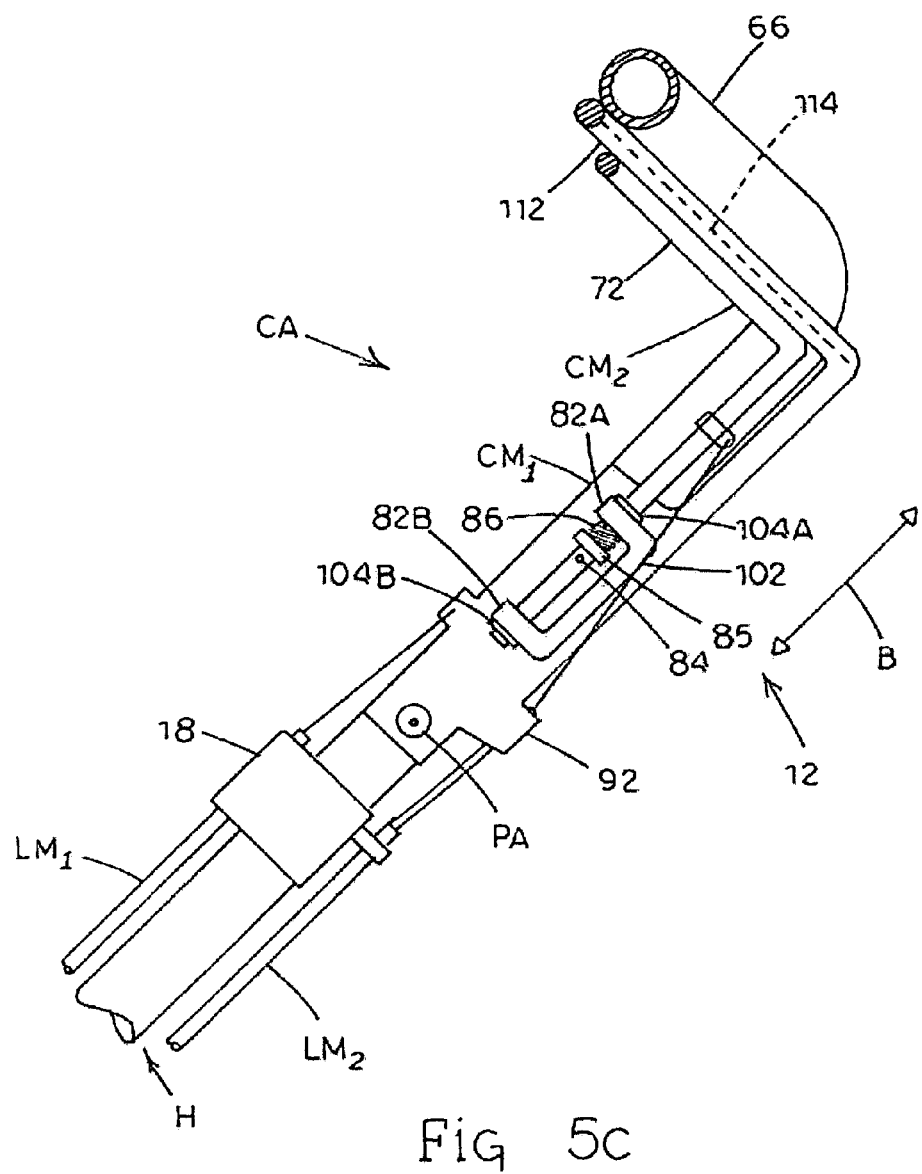
FIG. 5C is a side elevation view of the upper section of the handle, illustrating the control apparatus of FIGS. 5A and 5B in the ON position but linearly translated to a different speed position as compared to FIG. 5B.

Referring now to FIGS. 5A-5C, control apparatus CA is illustrated according to an alternative embodiment. First control member CM1 includes a handle portion or extension 112 that is generally accessible to the operator between proximal-most end section 72 of second control member CM2 and proximal-most end section 66 of handle H. Extension 112 pivots with second control member CM2 about pivot axis PA. In advantageous embodiments, extension 112 has the same general profile of second control member CM2 and proximal end section 12 of handle H. In addition, extension 112 can be contoured so as to have a concave recess 114 that generally conforms to the outer contour of proximal-most end section 66 of handle H, allowing extension 112 to fit closely with handle H in the positions shown in FIGS. 5B and 5C.

In general, the operation of control apparatus CA illustrated in FIGS. 5A-5C is the same as described above with reference to FIGS. 3A-3C. Thus, FIG. 5A corresponds to the OFF position of lawnmower LM, and FIGS. 5B and 5C correspond to the ON position at which speed adjustment is effected through linear translation of second control member CM2. Control apparatus CA can be actuated between the ON and OFF positions through the pivoting movement generally indicated by arrow A, by manipulating either second control member CM2 or extension 112. FIG. 5B can correspond to the LOW speed position and FIG. 5C can correspond to the HIGH speed position. Control apparatus CA can be actuated between the HIGH and LOW speed positions along the linear direction generally indicated by arrow B, by manipulating second control member CM2 as described previously. In FIGS. 5B and 5C, extension 112 is immediately adjacent to proximal-most end section 66 of handle H. This configuration eases the ability of the operator to grasp handle H and maneuver lawnmower LM while maintaining lawnmower LM in an ON state, without having to manipulate second control member CM2 and thus significantly opening the palm of the hand. Moreover, this configuration assists the operator in maintaining a comfortable grasp of handle H while powering up lawnmower LM such as by actuating a pull cable. Finally, it will be noted that the requisite operator presence control function is preserved in this embodiment. Control apparatus CA will return to the OFF position of FIG. 5A as a result of the operator releasing his or her grip on handle H. Due to their close proximity, releasing handle H will result in releasing extension 112.

It can therefore be seen from the foregoing that the embodiments disclosed herein provide control apparatuses and methods in which a single lever can be utilized to implement both operator presence control and speed control.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A method for controlling a self-propelled machine, comprising:
   (a) pivoting a control apparatus relative to a handle to which the control apparatus is coupled from an OFF position at which an operation of a self-propelled machine communicating with the control apparatus is disabled to an ON position at which the operation of the self-propelled machine is enabled, whereby pivoting actuates a first linking member intercoupling the control apparatus and a machine control component of the self-propelled machine; and
   (b) while the control apparatus is in the ON position, linearly translating the control apparatus relative to the handle to adjust a speed at which the self-propelled machine is propelled, whereby translation actuates a second linking member intercoupling the control apparatus and a transmission of the self-propelled machine.

2. The method according to claim 1 wherein pivoting the control apparatus comprises pivoting a control member of the control apparatus, the control member is oriented at an angle relative to the handle at the OFF position, and the control member is substantially parallel to at least a portion of the handle at the ON position.

3. The method according to claim 2 wherein the control member is slidable relative to the handle, and translating the control apparatus comprises translating the control member.

4. The method according to claim 2 wherein pivoting the control apparatus comprises manipulating the control member.

5. The method according to claim 2 wherein pivoting the control apparatus comprises manipulating an extension of the control apparatus, and manipulating the extension causes the control member to pivot.

6. A method for controlling a self-propelled machine, comprising:
   (a) pivoting a control apparatus relative to a handle to which the control apparatus is coupled from an OFF position at which a self-propelled machine communicating with the control apparatus is disabled to an ON position at which the self-propelled machine is enabled, whereby pivoting actuates a first linking member intercoupling the control apparatus and a machine control component of the self-propelled machine;
   (b) while the control apparatus is in the ON position, linearly translating the control apparatus relative to the handle to adjust a speed at which the self-propelled machine is propelled, whereby translation actuates a second linking member intercoupling the control apparatus and a transmission of the self-propelled machine; and
   (c) wherein the control apparatus comprises a first control member pivotably coupled to the handle and a second control member coupled to the first control member, and pivoting the control apparatus comprises pivoting the second control member to pivot the first control member.

7. The method according to claim 6 wherein the second control member is slidably coupled to the first control member, and translating the control apparatus comprises sliding the second control member relative to the first control member.

8. The method according to claim 1 wherein translating the control apparatus comprises moving at least a portion of the control apparatus generally toward an end of the handle farthest from the transmission.

9. The method according to claim 8 wherein translating the control apparatus increases the speed.

10. The method according to claim 1 wherein the control apparatus comprises a first control member pivotably coupled to the handle and a second control member slidably coupled to the first control member, and translating the control apparatus comprises sliding the second control member relative to the first control member.

11. The method according to claim 1 comprising activating a motor communicating with the transmission while the control apparatus is in the ON position.

12. The method according to claim 11 comprising maintaining the control apparatus in the ON position by gripping the handle and a linearly translatable control portion coupled to the second linking member.

13. The method according to claim 11 comprising maintaining the control apparatus in the ON position by gripping the handle and an extension of the control apparatus.

14. A method for controlling a self-propelled machine, comprising:
   (a) pivoting a control apparatus relative to a handle to which the control apparatus is coupled from an OFF position at which an operation of a self-propelled machine communicating with the control apparatus is disabled to an ON position at which the operation of the self-propelled machine is enabled, whereby pivoting actuates a first linking member intercoupling the control apparatus and a machine control component of the self-propelled machine;
   (b) while the control apparatus is in the ON position, linearly translating the control apparatus relative to the handle to adjust a speed at which the self-propelled machine is propelled, whereby translation actuates a second linking member intercoupling the control apparatus and a transmission of the self-propelled machine; and
   (c) wherein the control apparatus comprises a first control member pivotably coupled to the handle and a second control member coupled to the first control member, and pivoting the control apparatus comprises pivoting the second control member to pivot the first control member.

15. The method according to claim 14 wherein the second control member is slidably coupled to the first control member, and translating the control apparatus comprises sliding the second control member relative to the first control member.

16. The method according to claim 14 wherein translating the control apparatus comprises moving at least a portion of the control apparatus generally toward an end of the handle farthest from the transmission.

* * * * *